Figure 1:
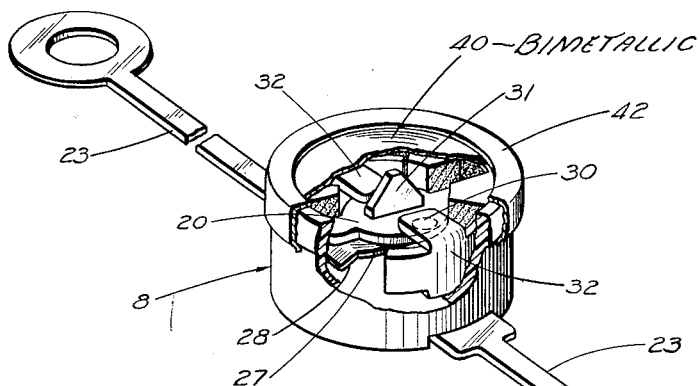

Sept. 13, 1955  J. D. BOLESKY  2,717,936
THERMOSTATIC SWITCH
Filed Sept. 5, 1952

INVENTOR.
JOHN D. BOLESKY
BY
ATTORNEY

United States Patent Office 2,717,936
Patented Sept. 13, 1955

2,717,936

THERMOSTATIC SWITCH

John D. Bolesky, Mansfield, Ohio, assignor to Adrian Medert, Cleveland, and Russell W. Bolesky, Mansfield, Ohio, trustees Application September 5, 1952, Serial No. 308,117

7 Claims. (Cl. 200—138)

This invention relates to electric switches and more particularly to new and improved thermostatically controlled switches and the like.

The device contemplated by this invention is particularly adapted for use with small household appliances where an electric current is used for heating purposes and where it is highly desirable that the temperature of the appliances be controlled within relatively close predetermined temperatures. Heretofore, thermostatic switches most commonly used with such appliances, due to their inherent structure embodied many undesirable characteristics. For example, such devices were erratic in performance and control due to improper positioning of the thermal element with respect to the source of heat and to the influence upon the thermal element of heat flowing from the contacts, the latter case was most prevalent where the thermal element was in the circuit through the switch. This unstable condition of the switch adversely affected the operating conditions of the appliance to the extent that after a period of time, operation became uncertain and unreliable. The thermostatic switch of the present invention overcomes the drawbacks and undesirable features of the prior devices.

It is among the objects of the present invention to provide a thermostatic switch for use in small electrical household appliances which is uniform and constant in operation, has greater sensitivity to changes in temperature than prior devices and has a quick snap like make and break between the contacts thereof thus avoiding arcing and resultant burning of the contact points.

Another object of the present invention is to provide a thermostatic switch which is economical to manufacture, is simple in operation and may be easily and readily adapted for controlling the temperature of small household appliances.

Figure 2:
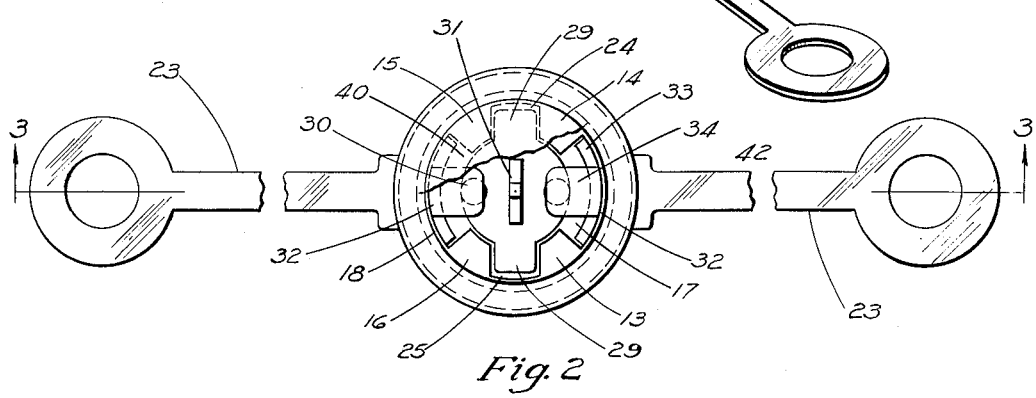
Figure 3:
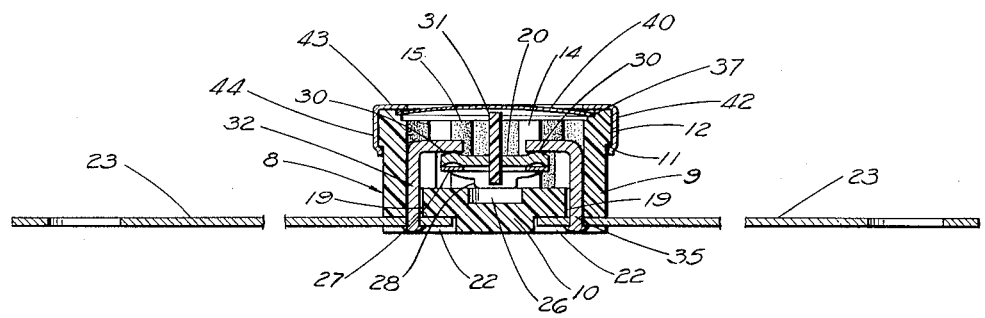
Figure 4:
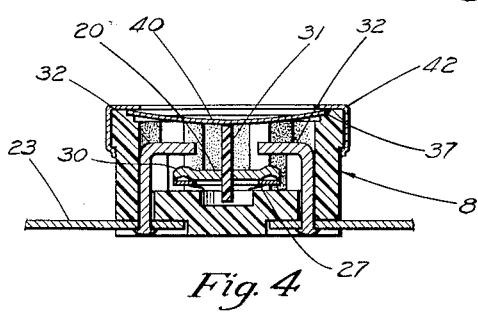

These and other objects and advantageous features of the invention not at this time more particularly pointed out will become more apparent as the nature of the invention is better understood from the following detailed description taken in conjunction with the accompanying drawing wherein like reference characters denote corresponding parts, and wherein:

Figure 1 is a perspective view of a thermostatic switch embodying the present invention with parts thereof broken away to better illustrate the device, Figure 2 is a top plan view of the device of Figure 1 with the thermostatic element and retaining member therefore removed, Figure 3 is a longitudinal sectional view taken on the line 3—3 of Figure 2, illustrating the elements of the device in closed circuit position, and Figure 4 is a sectional view similar to that shown in Figure 3 with the elements of the device in open circuit position.

With reference to the accompanying drawing, there is illustrated a thermostatically controlled device embodying a switch for controlling an electrical circuit made in accordance with the teachings of the present invention and comprising a substantially cylindrical housing 8 having a side wall 9 and a bottom wall 10, which is preferably made of an electrical insulating material which is heat resistant to a fair degree, such as a phenolic condensation product. The side wall 9 of the housing is formed with an outwardly extended flange 11 forming a radial surface 12, the purpose of which will appear hereinafter.

The inner surface of the side wall 9 of the housing is provided with diametrically opposed inwardly projecting wall portions 13, 14, 15 and 16. The wall portions 13 and 14 and the wall portions 15 and 16, respectively, define therebetween diametrically opposed arcuate recesses 17 and 18. The bases of recesses 17 and 18 are provided with slots 19 extending through the bottom wall 10 of the housing. The exterior surface of the bottom wall 10 is cut away adjacent the slots 19 to form substantially rectangular notches 22 extending inwardly from the periphery of the bottom wall 10. Received in the notches 22 are the inner ends of conductor straps or elements 23, the free ends of which are connected in the electric heating circuit of an appliance containing the device of the present invention. The wall portions 14 and 15 and 13 and 16, respectively, define therebetween diametrically opposed vertical slots 24 and 25. The inner surface of the bottom wall 10 is depressed at its center to form a circular recess 26.

Mounted on the bottom wall 10 within the housing 8 is a ring like spring member 27 having diametrically extending ears 28 which are arranged to be received within the vertical slots 24 and 25. The spring member 27 is suitably arched to provide the requisite amount of spring tension. The arched portion of spring member 27 is formed with a flat surface which bears against the lower surface of a circular bridging contact member 20 which is formed with ears 29 which are also arranged to seat and be freely movable within the slots 24 and 25 above the ears 28 of spring member 27 and serve to maintain the contact member 20 in proper operative position within the housing 8. Intermediate the ears 29 and adjacent the periphery thereof the member 20 is provided with pressed out buttons 30 which serve as contacts. Mounted centrally on the contact member 20 is a bumper button 31 having a shank portion extending through the member 20 and adapted to extend into the recess 26 when the contact member 20 is moved downwardly against the resistance of spring member 27.

Positioned within the arcuate recesses 17 and 18 are stationary contact members 32 each of which comprises an arcuate body portion 33 which seats within and substantially fills the space between the respective wall portions forming the recesses and an interned horizontal portion 34 which extends over the contact member 20 and is arranged to be engaged by a contact button 30 formed thereon. The stationary contact member 32 is formed with a dependent shank portion 35 which extends downwardly through the opening 19 and is secured to the inner end of the conductor element 23 situated within the notch 22 and adjacent thereto. The shank is suitably formed so that when attached to the terminal strap 23, it is secured thereto with a mechanical and electrical joint which is not dependent for its current carrying characteristics on the housing in which it is disposed. The joint between these two parts is independent of the molded housing in which the elements are assembled and will not become loose in use causing high resistance to the flow of current thereacross. The flat surfaces on the spring member 27 bear against the lower surface of the movable contact member at a point in a vertical line through the contact buttons 30 and the horizontal portions 34 of the member 20, serving to maintain the buttons 30 in engagement with the stationary contacts.

The open end of the housing 8 is counterbored to form a seat 37 which receives a disc-like composite thermostatic plate 40. The thermostatic plate 40 may be a dished bimetallic snap acting thermostatic element being characterized in that its central portion has one position of stable equilibrium when it is cold and another relatively stable position of equilibrium when it is hot, the hot and cold positions having opposite curvature. As illustrated in Figure 3, the thermostatic element is shown when the same is cold having an outward curvature, and in Figure 4, the element is illustrated in the position when it is hot, being curved inwardly and engaging the bumper button 31. The edge of the circular thermostatic plate 40 is received within the shouldered portion 37 of the wall of the housing and is maintained therein by a mounting plate 42 which has a circular opening, the edge portions 43 of which overlap and confine the periphery of the thermostatic plate. The mounting plate 42 is formed with a depending side flange 44 which has its lower edge turned inwardly and seated below the surface 12 thereby securing the plate on the housing 8. The central portion of the plate 40 freely moves between its positions of opposite concavity in response to change in temperature and serves to move the contact member 20 downwardly against the pressure exerted by spring member 27 thereby breaking the circuit between the contact members 32 as it moves from its first position of concavity as shown in Figure 3 to its second position as shown in Figure 4.

Having thus described my invention, what I desire to obtain by Letters Patent is covered in the appended claims.

I claim:

1. A thermostatic control device comprising a hollow, cylindrical housing having an open end and a closed end, inwardly projecting wall portions defining diametrically opposed vertical slots in the interior wall of said housing, spaced stationary contact members mounted within said housing intermediate said slots, a movable contact member bridging the space between said stationary contact members and having opposed extensions engaging within said slots, spring means for maintaining said movable contact member in engagement with said stationary contact members, a snap acting thermostatic plate having its peripheral edge portion confined in the open end of said housing and having two positions of stability, said thermostatic plate passing automatically from its first position to its second position of stability upon change of temperature to a predetermined degree, said thermostatic plate in its second position adapted to have its central portion engage and move said movable contact out of engagement with said stationary contacts.

2. A thermostatic control device comprising a hollow, cylindrical housing having a side wall and a bottom wall closing one end of the housing, inwardly projecting side wall portions defining diametrically opposed slots in the interior wall of said housing, spaced stationary contact members mounted within the space between said slots and having contact portions projecting inwardly from the upper edge thereof, a contact member having lugs engaging the said slots for guided movement therewithin and having contacts formed thereon engageable with said contact portions of said stationary contact members, spring means for maintaining said movable contact member in engagement with said contact portions, a snap acting thermostatic plate having its peripheral edge portion confined in the open end of said housing and having two positions of stability, said thermostatic plate passing automatically from its first position to its second position of stability upon change of temperature to a predetermined degree, said thermostatic plate in its second position adapted to have its central portion engage and move said movable contact member away from said contact portions.

3. A thermostatic control device comprising a hollow, cylindrical housing having a side wall and a bottom wall, inwardly projecting side wall portions defining two pairs of diametrically opposited slots in the interior wall of said housing, spaced stationary contact members mounted within one pair of said slots and having contact portions projecting inwardly from the upper edge thereof, a contact member movable within the other pair of said slots and having contacts formed thereon engageable with said contact portions of said stationary contact members, spring means for maintaining said movable contact member in engagement with said contact portions, said spring exerting pressure diametrically on said movable contact through said contact portions, a snap acting thermostatic plate having its peripheral edge portion confined in said housing and having two positions of stability, said thermostatic plate passing automatically from its first position to its second position of stability upon change of temperature to a predetermined degree, said thermostatic plate in its second position adapted to have its central portion engage and move said movable contact member away from said contact portions.

4. A thermostatic control device comprising a tubular housing including a side wall and a bottom wall, side wall portions defining vertical slots in the interior of said housing, an electric switch mounted within said housing including spaced stationary contacts, a movable contact member bridging the space between said stationary contacts and having opposed extensions engaging within said slots, a snap acting thermostatic plate having it peripheral edge portion confined in the open end of said housing and having two positions of stability, said thermostatic plate passing automatically from its first position to its second position of stability upon change of temperature to a predetermined degree, said thermostatic plate in its second position adapted to have its central portion engage and move said movable contact and open said switch.

5. A thermostatic control device comprising a tubular housing including a side wall, a bottom wall and an open end, side wall portions defining opposed arcuate slots within said housing, stationary contact members mounted in said arcuate slots each having an integral inwardly projecting contact portion, a movable contact member bridging the space between the contact portions of said contact members, spring means for maintaining the movable contact in engagement with said stationary contacts, a snap acting thermostatic plate mounted in the open end of said tubular housing having two positions of stability, said thermostatic plate passing automatically from its first position to its second position of stability upon a rise in temperature to a predetermined degree, said thermostatic plate in its second position adapted to have its central portion engage and move said movable contact out of engagement with said stationary contacts.

6. A thermostatic control device comprising a cylindrical housing having an open end and a closed end, side wall portions defining diametrically opposed arcuate slots within said housing, stationary contact members mounted in said slots having an arcuate body portion, a contact portion extending inwardly at right angles from the upper edge of the body portion and a shank portion extending through the closed end of the housing arranged to be secured to a terminal, a movable contact member bridging the space between the contact portion of said stationary contact members, a snap acting thermostatic plate seated within the open end of said housing having two positions of stability, said thermostatic plate passing automatically from its first position to its second position of stability upon a rise in temperature to a predetermined degree, said thermostatic plate in its second position adapted to have its central portion engage and move said movable contact member out of engagement with said contact portions.

7. A thermostatic control device comprising a cylindrical housing having a side wall, having an open end and a closed end, inwardly extending side wall portions defining vertically disposed arcuate slots within said housing, stationary contact members mounted in said slots having an arcuate body portion, a contact portion extending inwardly at right angles from the upper edge of the body portion and a terminal portion projecting through the closed end of the housing, a terminal member secured to said terminal portion of the stationary contact, said terminal member and contact member forming a unit independent of the housing, a movable contact member bridging the space between the contact portions of said stationary contact members, spring means for maintaining the movable contact member in engagement with said stationary contact portions, a snap acting thermostatic plate confined in the open end of said housing and having two positions of stability, said thermostatic plate passing automatically from its first position to its second position of stability upon a rise in temperature to a predetermined degree, said thermostatic plate in its second position adapted to have its central portion engage and move said movable contact member out of engagement with said contact portions.

References Cited in the file of this patent

UNITED STATES PATENTS

| | | |
|---|---|---|
| 1,972,832 | Spencer | Sept. 4, 1934 |
| 2,238,881 | Evans | Apr. 22, 1941 |